United States Patent [19]
Radchenko et al.

[11] 3,708,246
[45] Jan. 2, 1973

[54] ELECTROMAGNETI PUMPS FOR LIQUID METALS

[75] Inventors: Ruslan Vasilievich Radchenko; Stanislav Alexandrovich Mokrushin, both of Sverdlovsk, U.S.S.R.

[73] Assignee: Otdel Fiziko-Tekhnicheskilch Problem Energetiki Uralskogo Filiala An SSR Filiala Am SSSR, Sverdlovsk, U.S.S.R.

[22] Filed: July 12, 1971

[21] Appl. No.: 161,487

[52] U.S. Cl. ..........................417/50, 310/11, 417/49
[51] Int. Cl. ..............................................H02k 45/00
[58] Field of Search .....................310/11; 417/49, 50

[56] References Cited

UNITED STATES PATENTS 2,397,785  4/1946  Friedlander............................417/50
2,686,474  8/1954  Pulley....................................417/50

FOREIGN PATENTS OR APPLICATIONS 847,492  10/1956  Great Britain..........................417/50
745,807  10/1954  Sweden..................................417/50

Primary Examiner—William L. Freeh
Assistant Examiner—John T. Winburn
Attorney—Eric H. Waters et al.

[57] ABSTRACT

A gapless and an air-gap magnetic circuit are separated by a clearance which accommodates a straight conduit conveying a liquid metal. The air-gap magnetic circuit is the multipole core of an A.C. electromagnet and serves to establish a magnetic field in the liquid metal. The gapless magnetic circuit is a polyphase transformer with single-turn secondary windings formed by the liquid metal and a conductor enveloping the transformer core. The gapless magnetic circuit induces an electric current in the liquid metal. The magnetic field and the electric current interact to produce an electromagnetic head.

2 Claims, 3 Drawing Figures

ELECTROMAGNETI PUMPS FOR LIQUID METALS

The present invention relates to an improvement in means for the handling of liquids, and more specifically to electromagnetic pumps for liquid metals, and may be utilized in, say, nuclear-power engineering to pump a liquid-metal heat-carrying agent in nuclear reactors or to convey molten metals in metallurgy.

In the prior art, there is an electromagnetic pump which has two conduits with thin electrically conducting walls. These conduits are part of a single secondary turn of a transformer with a gapless magnetic circuit. The primary (power winding of this transformer is energized from one phase of a polyphase source and induces current in the secondary turn. In the conduits, a magnetic field is established by a field circuit connected to another phase of the same source in such a manner that the current and the field are in phase. The in-phase current and field interact to produce a head. The magnetic flux consecutively links the two conduits, while the current in the conduits flows in opposite directions. Therefore, in order to produce a total head, the conduits are interconnected by an U-shaped hose.

A disadvantage of this prior-art arrangement consists in that the U-shaped hose interconnecting the conduits inevitably entails considerable hydraulic losses and markedly handicaps the construction of electromagnetic pumps of higher capacity. As a rule, the conduits in a pump are arranged one above the other, which increases the overall magnetic gap and impairs tHe power factor of the entire system.

Another disadvantage of the pump is that there is an unbalanced load on the phases of the supply source.

It is an object of the present invention to provide an electromagnetic pump which materially reduces hydraulic losses and places a balanced load on the phases of the supply source.

With this and other objects in view, the present invention resides in that in an electromagnetic pump having a conduit placed between a gapless and an air-gap magnetic circuit producing an electric current and a magnetic field at right angles to each other, according to the invention the air-gap magnetic circuit is a multipole core of an A.C. electromagnet, carrying field windings, and the gapless magnetic circuit is a polyphase transformer with its single-turn secondaries formed by the liquid metal in the portions of the conduit where the current and magnetic field interact and by a conductor which is in contact with the metal and envelopes both the liquid metal and the transformer core, such that the number of poles and secondary turns is a multiple of the number of phases in the source energizing the magnetic circuits and the conduit between the magnetic circuits is made straight.

Owing to a straight conduit, the hydraulic losses in the pump are materially reduced, while its magnetic circuits impose a balanced load on the supply source.

It is preferable to offset the turns in the outer openings of the polyphase transformer from center towards tHe outer walls.

The invention will be more fully understood from the following description of a preferred embodiment when read in connection with the accompanying drawings wherein.

Figure 1:
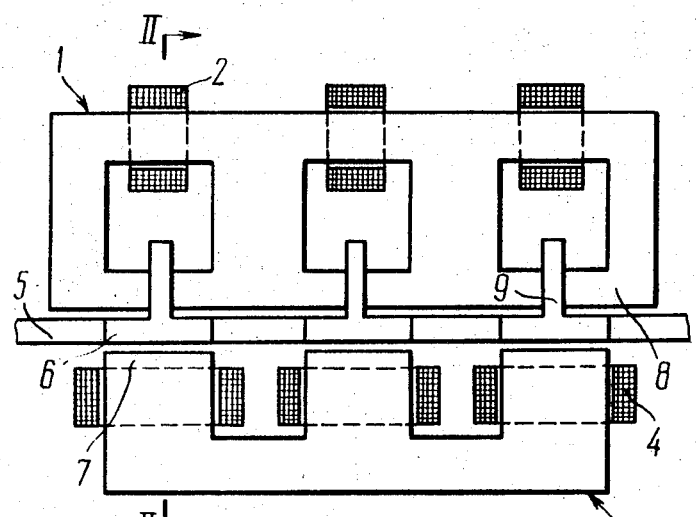
FIG. 1 is a circuit schematic diagram of a pump according to the invention, operating on a three-phase supply.

Referring to FIG. 1, there is a pump comprising a gapless magnetic circuit 1 which is a three-phase transformer with primary windings 2. The electric power to be converted into a useful head in a conduit, as will be shown shortly, is applied to the transformer, and so for brevity the circuit containing this transformer or the transformer proper will be referred to as the power circuit and the power transformer.

The air-gap magnetic circuit 3 is the air-gap three-pole core of an A.C. electromagnet, with windings 4, which serves to set up a magnetic field in a conduit 5. The electric power applied to this circuit goes to sustain the losses involved in establishing the magnetic field, and so for brevity it will be called the field circuit.

Figure 2:
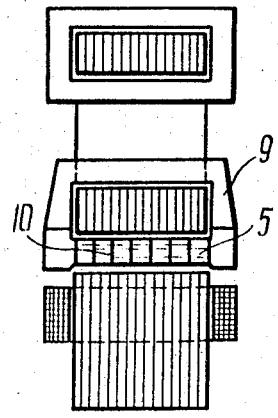
FIG. 2 is section II—II of FIG. 1.

The portions 6 of the conduit where the electric current and the magnetic field interact are located opposite the poles of the air-gap magnetic circuit. The number of poles 7 is a multiple of the number of phases in the supply source. The conductors 9 (FIG. 2) enveloping the core 8 of the power transformer are in electric contact with the liquid metal, so that both the conductors 9 and the liquid metal within the portions 6 of the conduit 5 make up loops which are the secondaries of the power transformer.

The number of secondary turns thus formed should be a multiple of the number of phases in the supply source.

At the inlet to and the outlet from each portion 6 of the conduit 5, there are longitudinal partitions 10 which prevent the current from spreading into other portions of the conduit, where the current and field do not interact.

Figure 3:
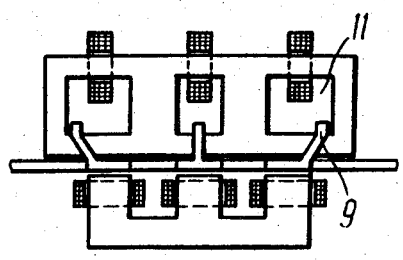
FIG. 3 shows the same as FIG. 1, except that the turns in the outer openings of the transformer core are offset.

In the outer openings 11 of the transformer core the conductors 9 are offset from the middle of the openings towards the outer walls as shown in FIG. 3 in order to minimize eddy-current losses. With this arrangement of the conductors, eddy-current losses are practically non-existent.

The gapless and air-gap magnetic circuits 1 and 3 are arranged so as to form a clearance for the straight conduit 5.

The magnetic fluxes due to the field windings 4 have their path in the gap between the poles 7 of the field circuit and the core 8 of the power circuit. In the core 8, these fluxes are added together according to the phase shift between them. The fluxes due to the field circuit do not extend into other parts of the power transformer, because their reluctance is high in comparison with that of the core 8. The total magnetuc flux in the core 8 is the sum of the magnetic fluxes due to each pair of transformer primary and secondary windings operating on the same phase. Therefore, the dimensions of the core 8 will be decided by the cross-sectional area required to accommodate the aggregate magnetic flux of the power and field circuits.

Within the portions 6, the magnetic field acts across the conduit 5, while the current in the secondary windings within the same portions is at right angles to the field. The useful head is produced as an outcome of interaction between the mutually perpendicular current and field and is directed along the conduit 5. The head is a maximum when the current and field within each of the portions 6 are in phase. This phase relationship can be obtained by suitably connecting the windings to the phases of the supply source. Since in the air-gap magnetic circuit the number of poles is a multiple of the number of phases in the supply source, the load will always be balanced, as long as there are at least two phases in the source.

What is claimed is:

1. An electromagnetic pump for liquid metals, comprising: a practically straight conduit for the liquid metal to be handled; a gapless and an air-gap magnetic circuit separated by a clearance accommodating said conduit; said gapless and air-gap circuits respectively induce in the metal an electric current and a magnetic field which are at right angles to each other and interact to produce an electromagnetic head moving said metal in said conduit; said air-gap magnetic circuit being a multi-pole a.c. electromagnet and said gapless magnetic circuit being a polyphase transformer with as many pairs of primary and secondary windings as there are poles in the multipole electromagnet; said secondary windings being formed by said liquid metal in portions of said conduit where the current and field interact and by a conductor which together with the liquid metal envelopes a core of said transformer; and the number of said poles in the air-gap magnetic circuit and of secondary windings is a multiple of the number of phases in said power source.

2. An electromagnetic pump, as in claim 1, in which the secondary conductors in the outer openings of the transformer core are offset from center towards the outer walls.

* * * * *